(12) United States Patent
Long

(10) Patent No.: US 8,460,777 B2
(45) Date of Patent: Jun. 11, 2013

(54) MULTIFUNCTIONAL RADIATION-HARDENED LAMINATE

(75) Inventor: David S. Long, Erda, UT (US)

(73) Assignee: Alliant Techsystems Inc., Arlington, VA (US)

( * ) Notice: Subject to any disclaimer, the term of this patent is extended or adjusted under 35 U.S.C. 154(b) by 1114 days.

(21) Appl. No.: 12/247,090

(22) Filed: Oct. 7, 2008

(65) Prior Publication Data
US 2010/0086729 A1 Apr. 8, 2010

(51) Int. Cl.
| B32B 3/12 | (2006.01) |
| B32B 5/16 | (2006.01) |
| B32B 9/04 | (2006.01) |
| B32B 15/00 | (2006.01) |
| B32B 37/04 | (2006.01) |
| B32B 5/02 | (2006.01) |
| B32B 5/12 | (2006.01) |
| B32B 27/00 | (2006.01) |
| E04H 7/22 | (2006.01) |

(52) U.S. Cl.
USPC ........ 428/116; 428/327; 428/328; 428/411.1; 428/209; 52/302.1; 442/248; 442/254; 442/121; 442/58

(58) Field of Classification Search
None
See application file for complete search history.

(56) References Cited

U.S. PATENT DOCUMENTS

| 3,446,682 A | * | 5/1969 | Wawner, Jr. ................... 216/96 |
| 4,029,838 A | * | 6/1977 | Chamis et al. ............. 428/293.1 |
| 4,581,285 A | | 4/1986 | Mahefkey, Jr. |
| 4,671,841 A | * | 6/1987 | Stephens ..................... 156/292 |
| 4,919,995 A | | 4/1990 | Joly |
| 5,038,693 A | | 8/1991 | Kourtides et al. |
| 5,154,777 A | | 10/1992 | Blackmon et al. |
| 5,225,265 A | | 7/1993 | Prandy et al. |
| 5,288,537 A | * | 2/1994 | Corden ......................... 428/116 |
| 5,370,921 A | | 12/1994 | Cedarleaf |
| 5,454,425 A | * | 10/1995 | Kao ............................... 164/520 |
| 5,488,766 A | | 2/1996 | Gerry et al. |
| 5,593,752 A | | 1/1997 | Pollatta et al. |
| 5,866,272 A | * | 2/1999 | Westre et al. ................ 428/593 |
| 5,975,201 A | | 11/1999 | Roberts et al. |
| 6,061,243 A | | 5/2000 | Barnett et al. |
| 2002/0102196 A1 | * | 8/2002 | Smalley et al. .............. 422/198 |
| 2005/0208851 A1 | | 9/2005 | Gooliak |
| 2006/0090636 A1 | | 5/2006 | Yang et al. |
| 2007/0139862 A1 | | 6/2007 | Tateishi et al. |
| 2007/0194256 A1 | | 8/2007 | Srobel et al. |

FOREIGN PATENT DOCUMENTS

WO WO 2008/048705 A1 * 4/2008

OTHER PUBLICATIONS

Epon Epoxy Resin 828 Data Sheet, Momentive Technical Data Sheet, (2005).*

Boron Nitride Data Sheet, http://www.a-m.de/englisch/lexikon/bornitrid.htm (2004).*

* cited by examiner

Primary Examiner — David Sample
Assistant Examiner — Nicole T Gugliotta
(74) Attorney, Agent, or Firm — TraskBritt (57) ABSTRACT

A multifunctional composite having high strength, low weight, low distortion, low CTE, impact resistance, and multi-faceted radiation protection.

49 Claims, 4 Drawing Sheets

MULTIFUNCTIONAL RADIATION-HARDENED LAMINATE

FIELD OF THE INVENTION

This invention is related to multifunctional composite structures that are resistant to impact, radiation, thermal distortion, and thermal stresses.

BACKGROUND

Resistance to the effects of object impact, radiation, thermal distortion and thermal stresses are desirable in composite material laminates used in different types of structures where dimensional precision, high strength and light weight are preferred.

It is desirable to have high strength lightweight composite structures that can be used on aircraft, spacecraft, satellites, missiles, and the like that are resistant to impact damage from various types of objects. For instance, aircraft and spacecraft need protection from impact with foreign objects, such as rain, birds, rocks, dirt, micro-meteoroids, and orbital debris. For some types of aircraft, foreign objects will typically approach at velocities less than that of sonic velocity, approximately 0.3 km/second and cause damage to the aircraft. For spacecraft, foreign objects may approach at a high velocity or hyper velocity, in the range of 10 to 72 km/second and cause damage to an unprotected spacecraft.

In some instances, mechanical shields have been used to protect aircraft and spacecraft, such as aluminum shields. A typical aluminum shield consists of an outer aluminum wall and an inner aluminum wall enclosing a multi-layer material located in between. The multi-layer material may be selected for thermal insulating and/or shock dispersion properties, fabricated using metal foils or ceramic fabrics. However, mechanical shields impose a weight and instrument line of sight penalty on the craft to which they are applied.

High altitude aircraft, missiles, and space related craft benefit from radiation shielding using materials such as boron, tungsten, titanium, tantalum, gadolinium, hafnium, osmium, platinum, gold, silver, or palladium, or combinations thereof. Early radiation shielding materials for semiconductor devices have been made of a gold plated tungsten-copper alloy. Foils formed of such materials used in composite structures incorporated into the walls of spacecraft, and the like, are costly to fabricate, and are prone to warpage or mechanical failure in use because the organic adhesive used between the metal foil and other materials of the composite structure each have different coefficients of thermal expansion. Additionally, the adhesive bonds between dissimilar materials are not as robust as bonds between like materials and require proper processing.

Aircraft, missiles, and space related craft using composite structures also require protection from lightning strikes and Electro-static Discharge (ESD) from surface charging. Structures were initially protected from lightning strikes using rods and cables to ground the structure. Recently, aircraft and other metal structures were provided lightning protection by using a low resistance pathway through the structure as a means for energy dissipation from the lightning strike. However, composite structures formed of composite materials using thermosetting and thermoplastic polymer impregnated fiber reinforcement do not have sufficient surface conductivity with low resistant pathways for energy dissipation from lightning strikes or ESD. Carbon/graphite fiber within the matrix offer higher conductivity than fiberglass materials or high temperature thermoplastic reinforced materials but are still deficient for energy dissipation from lightning strikes or ESD. In some instances, multi-layered composites include metallic wire screen or foil layers in an attempt to deal with lightning strikes and ESD, and also Electromagnetic Interference (EMI) and Electromagnetic Pulse (EMP). Spacecraft ESD/EMI/EMP prevention requires grounding of the surface and other conductive elements to bleed charge between dielectric regions.

Composite structures on aircraft and spacecraft are subject to thermal stresses from both high temperatures and low temperatures. Composite structures on aerospace vehicles are subject to aero-convective heating and radiant heating as well as being subject to launch acoustics, rain, and other elements of the environment. Spacecraft are subject to heating from solar radiation and shadow cooling. The composite structure may use a multi-layer construction using various layers of metal foil, ceramic spacers, fibrous spacers, plastic layers, silica cloth, glass cloth, fibrous silica felt, and various combinations of such materials. Many aerospace structures for reflectors and instruments preferably comprise low CTE and low thermal distortion.

SUMMARY OF THE INVENTION

A multifunctional composite having high strength, low weight, low distortion, low CTE, impact resistance, and multi-faceted radiation protection.

DETAILED DESCRIPTION OF THE INVENTION

The present invention design significantly differs from previous spacecraft or other aerospace craft radiation shielding designs. Earlier radiation designs for aerospace craft typically focused on protection from ionizing damage, rather than protection from both primary ionizing damage with non-ionizing radiation damage and secondary production radiation damage. The present composite laminate for aerospace craft addresses protection from these radiation forms in a larger electromagnetic spectrum, and shielding of other possible events in any orbit or altitude of the spacecraft while minimizing thermal distortion.

Previous more recent spacecraft have been based conceptually on one of two types of design, which do consider primary and some secondary radiation effects. In the first type design, three material layers of construction are used (where Z equals the Atomic number of the material in the periodic table used in construction), comprising a Low Z material layer, a High Z material layer, and Low Z material layer construction but does not address the problems with exterior surface heating, exterior/interior ESD grounding, projectile impact layer spalling of inboard/outboard material layers, etc., where a Low Z material layer is exposed to environment. In the second type design, two material layers of construction are used (where Z equals the Atomic number of material in the periodic table used in construction) comprising a High Z material layer and a Low Z material layer but does not address the problems of layer thermal warpage, interior ESD grounding of the construction and projectile impact spalling of the inboard material layers. In addition, certain exterior metal choices in this configuration can actually amplify secondary radiation production under beta bombardment.

The present composite laminate aerospace craft design differs from previous aerospace craft designs by addressing multifunctional aspects of the construction of the craft including, but not limited to, thermal control, surface heating, ESD/EMI/EMP grounding, layer and material warpage, and impact damage. Five balanced and symmetric alternating high modulus metal and graphite adhesively joined layers represent the main structural base to which variants are added. This present design uses a composite construction which varies between five layers to nine or more layers of material generally described as comprising as follows from the outboard to inboard (where Z equals the Atomic number of material in the periodic table used in construction): an exterior thin low modulus thermal control polymer material layer, a high Z material layer, an optional thin thermal/electrically conductive metallic nanoparticle filled strand material or metallic filament Z-direction orientation stitch material in a layer, a low Z material layer, a high Z material layer, a low Z material layer, an optional thin thermally/electrically conductive metallic nano-strand material or metallic filament Z-direction orientation stitch material layer, a high Z material layer, and a post interior low modulus low Z material layer. The optional thin thermal/electrically conductive metallic nanoparticle filled strand material or metallic filament Z-direction orientation stitch material layer of material in a three-dimensional carbon weave is used here between the high Z material exterior/interior layer and a low Z material layer. A thin thermal control nanoparticle filled layer provides proper low solar absorption and high emissivity when used on the exterior of spacecraft composite construction. A first exterior high Z metal layer shields initial particle radiation but produces secondary Bremsstrahlung X-rays from primary electron particle radiation and secondary Neutron production from primary Proton particle radiation. Certain metal foil combinations are optimal for shielding both primary and secondary transmissions. There are cases where foil types with a different Z are better tuned for reducing secondary radiation production from primary beta particle radiation. If primary shield layers used in a composite construction are the wrong materials or too thick, weight increases and they may cause increased secondary production and backscatter or high energy particles to deposit energy on interior devices located within the composite construction. A first low Z material layer helps absorb the secondary radiation production from initial particle radiation. The Bremsstrahlung X-rays in turn produce photo-electrons which are absorbed in a second low Z layer material layer. A center high Z material layer and a final high Z material layer also blocks remaining primary particles. An interior conductive surface of a conductive layer provides a grounding flow path for remaining electrons and ESD since the low Z material layer is mostly dielectric. A post assembly interior insulating film as a material layer may be added to prevent ESD and electron flow to attached interior electronics boxes. Radiation transport analysis has shown feasibility of this design and is lighter and stiffer than a comparable aluminum shell baseline. Most primary material elements proposed here have been demonstrated in fabrication processing and in radiation survivability testing. In addition, the main structural five material layers are adhesively bonded to form a low distortion composite construction in a stack to provide micrometeorite or projectile hit protection. Impact resistance may be additionally improved by using a HDPE weave as the inboard post low Z material layer.

Low energy trapped protons in low earth orbit, laser threat, and nuclear threat can heat the surface of a composite construction damaging or warping the surface of the composite construction, thus requiring hot temperature capability and conduction in the composite construction. A conductive surface and subsurface in the composite construction will help dissipate heat. A conductive surface and subsurface is accomplished by the use of an external foil and possibly by addition of a thin metallic nano-strand material layer in a polymer resin carrier or by a metallic filament Z transverse orientation stitch material layer.

The composite structure of the present invention comprises a multifunctional solution for a primary structural laminate that is thermally stable and also functions as a full spectrum radiation-hardened shield for the payload and sensors of spacecraft, satellites, aircraft, missiles, and any aerospace vehicle. In general, the components forming the composite structure or the combined composite total have low coefficients of thermal expansion, high stiffness, and high strength. The requirements of the thicknesses of the layers forming the composite structure and the combinations of materials for the layers of the composite structure are generally determined by the radiation shielding required by the payload of craft when balanced with the thermal expansion/distortion performance affected by the thickness, stiffness, and coefficient of thermal expansion of the material of each layer forming the composite. The composite structure requires symmetry and balance for minimizing warpage. The high Z materials must have a modulus of elasticity and coefficient of thermal expansion to accommodate the characteristics of a low Z material to minimize thermal growth and distortion of the composite structure, and to minimize interlaminar thermal stresses. The order in which the different Z factor materials are stacked and the number of different types of Z factor materials provide multifunctional resistance to wide spectrum ionizing and non-ionizing radiation, primary radiation, impact spalling, EMI, ESD, surface charging, thermal pulse, and environmental protection.

For radiation protection of personnel, payload and sensors of a spacecraft, different types of materials can be used to block different types of radiation, with metals generally being more effective in blocking certain types of radiation having different wavelengths, mass, and energies than non-metals. The mass energy blocking/absorption coefficient for all types of materials is generally referred to as the Z factor for the material. The Z factor (Atomic Number) varies for each type of material. For instance, the Z factor for hydrogen is 1, the Z factor for beryllium is 4, the Z factor for carbon/graphite is 6, the Z factor for silicon is 14, the Z factor for titanium is 22, the Z factor for iron is 26, the Z factor for cobalt is 27, the Z factor for tantalum is 73, the Z factor for tungsten is 74, the Z factor for gold is 79, the Z factor for lead is 82, and the Z factor for uranium is 92. While the Z factor illustrates the relative ability of a material to block radiation, the overall efficiency of a material to block radiation is affected by the thickness of the material and the use of a variety of materials in a composite. For instance, two thin sheets of a material are generally more efficient in blocking radiation than one sheet of material having the same thickness as the two thin sheets of material. An ordered mixture of materials is more effective in blocking radiation than a single material. A carbon or graphite fiber has radiation absorbing properties. Furthermore, a composite laminate is more effective in blocking and absorbing radiation than either a metal layer or a graphite fiber layer alone.

Therefore, for selecting materials for radiation shielding purposes it is necessary to determine the thickness, order, and types of materials to be used interacting together as a composite based upon the types of radiation to be shielded. Use of variants described herein depends on target type.

In the embodiments of the invention described herein, the rule-of-mixtures, when applied to heterogeneous composite material micromechanics analysis, refers to the method of using fractional proportions of the volumes of the constituents multiplied by the constituent properties to obtain an effective composite value. This assumes an average thermoelastic stress state in orthogonal directions of the combined fiber and matrix such that $\sigma_{11}A_t = \sigma_f A_f + \sigma_m A_m$; while utilizing Hook's Law as proposed by Halpan and Tsai, for a composite stiffness such that $E_{11t} = E_f V_f + E_m V_m$ where $Vt = 1 = V_f + V_m$ with volume being proportional to Area. These relationships are then applied to basic lamination theory as proposed by Kirchhoff and Love and as presented by Pister, Dong, Reissner, and Stavsky for laminate properties. The lamination theory assumes a layered laminate of lamina plies composed of fiber and matrix in a plane stress state which is generally orthotropic and is also used in combination with reciprocal relations for poison's ratio in orthotropic lamina plies such as $v_{21}E_{11} = v_{12}E_{22}$. Similar relationships are used for effective transverse properties. This directly applies to modulus but may also be extended in application to thermal coefficients of expansion as proposed by Schapery, Halpan, and Pagano so that $\alpha_{11t} = E_f V_f \alpha_f + E_m V_m \alpha_m / E_f V_f + E_m V_m$.

Figure 1:
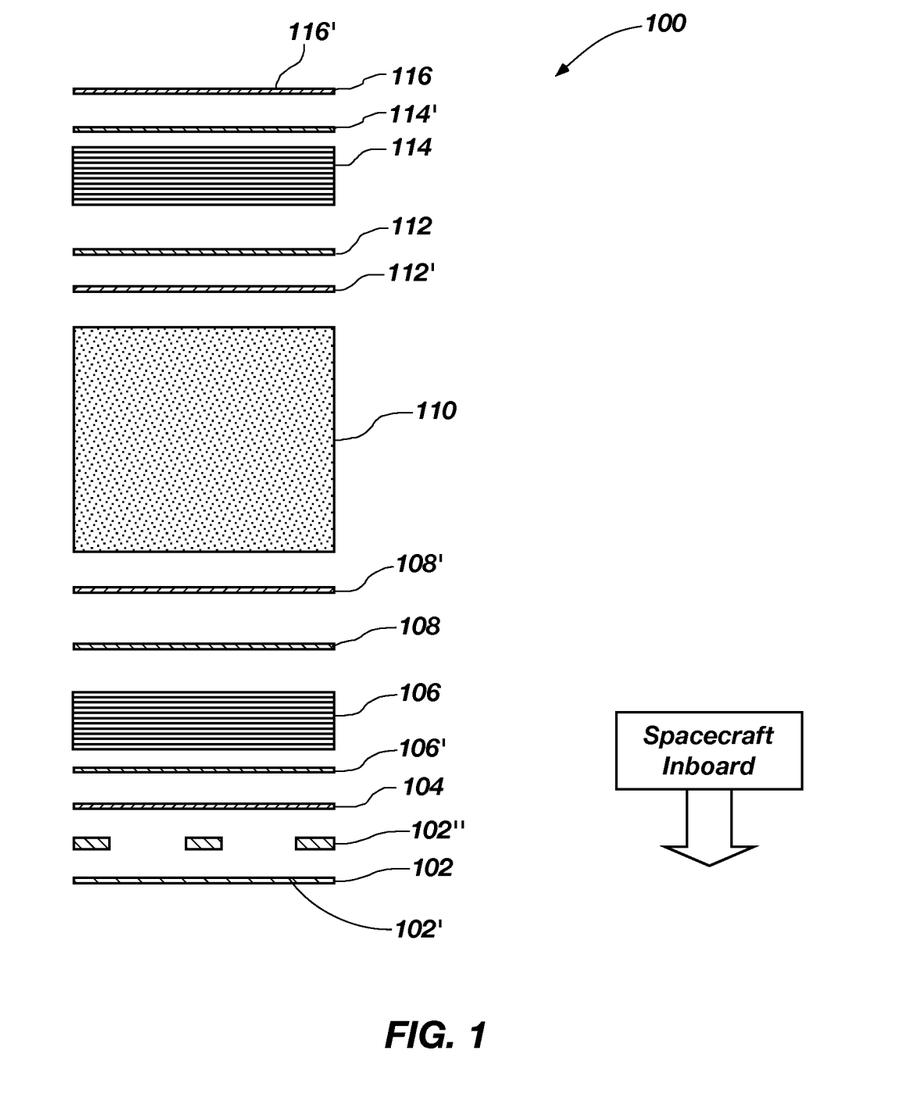
FIG. 1 is a cross-sectional view of a first embodiment of a composite structure of the invention as a cored panel.

Referring to drawing FIG. 1, a first embodiment of the composite structure 100 of the invention for use in forming flat cored panels which are radiation resistant, have high strength to weight, low distortion, and have high rigidity is illustrated in cross-section. The composite structure 100 comprises a laminate including various layers of materials. From the inboard of the spacecraft, a layer 102 of low modulus high density polyethylene comprising a film or fabric optionally hydrogenated and filled with carbon nano-tubes may be used with the layer 102, a metallized layer of aluminum 102' may be disposed thereon. The thickness of the layer 102 of the high density polyethylene film or fabric and the thickness of the metallized layer of aluminum 102' thereon may be any desired thickness to be determined by the environment, the loading, and the particular application in which the composite is to be used and is attached by thin epoxy layer 102".

Located outboard of the layer 102 is a layer 104 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 104 provides protection against various types of primary radiation, has a high melting point, high tensile strength with excellent elongation properties in response to thermal shock, and high tensile strength with high temperature resistance to a hot pulse from a nuclear event. The thickness and number of layers of foil forming the metallic foil layer 104 will vary depending upon the desired characteristics for the metallic foil layer 104.

Located outward of the metallic foil layer 104 is a fiber layer 106, a plurality of balanced and symmetric oriented uni-tape or fabric plies 106 of a high modulus carbon fiber and boron fiber embedded in a polymer resin matrix such as a thermosetting cyanate ester or epoxy resin. Typically, the carbon fiber comprises uni-tape and/or 8HS/PW weave form, having high compression strength and a slightly negative coefficient of thermal expansion. The boron fiber comprises uni-tape having a high modulus of elasticity, a low positive coefficient of thermal expansion, and neutron absorbing properties. The layer 106 preferably comprises a boron/carbon fiber laminate having a high stiffness to weight ratio and high strength to weight ratio. The layer 106 comprises various layers or plies, oriented and stacked in a prescribed pattern tailored to meet the structural requirements of the layer 106. The layer 106 may be formed to have a near-zero coefficient of thermal expansion in one laminate direction so that it is equal to or better than that of INVAR® 36 FeNi, a steel alloy having the lowest coefficient of thermal expansion of a traditional metal material. The layer 106 may have a low coefficient of moisture expansion in one direction with high stiffness and low weight. The layer 106 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon and boron fibers, laminates can be produced which have a coefficient of thermal expansion equivalent to or lower than INVAR® 36 FeNi and have a higher modulus of elasticity. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 106 is preferably formed of fabric or uni-tape of balanced and symmetric carbon fiber and boron fiber plies in a cyanate ester or epoxy resin. The fabric comprises approximately 1.87 gm/cc of carbon fiber while the boron fiber comprises 2.82 gm/cc boron on a tungsten filament. The cyanate ester or epoxy resin may comprise any suitable cyanate ester or epoxy resin having the desired properties for use with the carbon fibers and boron fibers and the desired coefficient of thermal expansion and coefficient of moisture expansion for the composite laminate. Alternatively, the layer 106 may be formed of commingled carbon fiber and boron fiber in each ply wherein the carbon fiber comprises a 1.87 gm/cc of carbon while the boron fiber comprises 2.82 gm/cc boron on a tungsten filament. Optionally, located inboard of layer 106, a thin polymer layer of metallic nano-strand material 106' or metallic Z transverse orientation stitch thread may be used.

Located outboard of layer 106 is layer 108, which comprises a metal foil layer, preferably one or more layers of tantalum foil, aluminum foil, titanium foil, tungsten foil, beryllium foil, or free-cut INVAR® 36 foil. The layer 108 has a film adhesive 108' coated thereon, such as a cyanate ester resin, for attachment to the layer 106 and any other layers.

Located outboard of the layer 108 is honeycomb composite core 110. The honeycomb composite core 110 comprises a web of KEVLAR® fabric or carbon fiber fabric embedded in a cyanate ester or epoxy resin. KEVLAR® is an aramid fiber, aramid being a shortened form of aromatic polyamide, sold by DuPont. The plies of KEVLAR® fabric or carbon fiber fabric embedded in a cyanate ester or epoxy resin may be formed to have a low coefficient of thermal expansion and near-zero coefficient of moisture expansion. The number of plies of KEVLAR® fabric or carbon fiber fabric embedded in a cyanate ester or epoxy resin are varied depending upon the desired strength of the honeycomb composite core 110, as well as the diameter of either the fiber of the KEVLAR® fabric or the fiber of the carbon fiber being varied.

Typically, the carbon fiber comprises uni-tape and/or 8HS/PW weave form, having high compression strength and a slightly negative coefficient of thermal expansion. The web forming the honeycomb composite core 110 preferably comprises a fiber laminate having a high stiffness to weight ratio and high strength to weight ratio. The web forming the honeycomb composite core 110 may be formed to have a low coefficient of thermal expansion in one laminate direction but has little impact to the overall panel coefficient of thermal expansion due to comparatively low stiffness. The web forming the honeycomb composite core 110 may have a low coefficient of moisture expansion in one direction with high stiffness and low weight. The plies forming the honeycomb composite core 110 comprise a laminate where the coefficient of thermal expansion in one direction is determined by the type of fiber selected, the orientation of each layer of those fibers, and the fiber volume fraction ratio (the ratio of the volume of fiber to the total volume of laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon and boron fibers, laminates can be produced which have a coefficient of thermal expansion equivalent to or lower than INVAR® 36 FeNi and have a higher modulus of elasticity. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the plies forming the honeycomb composite core 110 are preferably formed from fabric of KEVLAR® material or carbon fiber in a cyanate ester or epoxy resin. The cyanate ester or epoxy resin may comprise any suitable cyanate ester or epoxy resin having the desired properties for use with the carbon fibers and boron fibers and the desired coefficient of thermal expansion and coefficient of moisture of expansion for the composite laminate.

Located outboard of honeycomb composite core 110 is layer 112, which comprises a metal foil layer, preferably one or more layers of tantalum foil, aluminum foil, titanium foil, tungsten foil, beryllium foil, or free-cut INVAR® 36 foil. The layer 112 has a film adhesive 112' coated thereon, such as a cyanate ester resin, for attachment to the composite core 110 and any other layers.

Located outboard of layer 112 is a fiber layer 114, a plurality of balanced and symmetric oriented uni-tape or fabric plies of a high modulus carbon fiber and boron fiber embedded in a polymer resin matrix, such as a thermosetting cyanate ester resin or epoxy resin. Typically, the carbon fiber comprises uni-tape and/or 8HS/PW weave form, having high compression strength and a slightly negative coefficient of thermal expansion. The boron fiber comprises uni-tape having a high modulus of elasticity, a low positive coefficient of thermal expansion, and neutron absorbing properties. The layer 114 comprises various layers or plies, oriented and stacked in a prescribed pattern tailored to meet the structural requirements of the layer 114. The layer 114 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 114 may have a low coefficient of moisture expansion in one direction with high stiffness and low weight. The layer 114 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon and boron fibers, laminates can be produced which have a coefficient of thermal expansion equivalent to or lower than INVAR® 36 FeNi and have a higher modulus of elasticity. Through the particular selection of the type of fiber, the type of resin, and the angle of the fibers forming the plys of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 114 is preferably formed of uni-tape or fabric plies of carbon fiber and boron fiber in a cyanate ester resin or epoxy resin. The carbon fiber comprises approximately 1.87 gm/cc of carbon while the boron fiber comprises 2.82 gm/cc boron on a tungsten filament. The cyanate ester or epoxy resin may comprise any suitable cyanate ester or epoxy resin having the desired properties for use with the carbon fibers and boron fibers and the desired coefficient of thermal expansion and coefficient of moisture expansion for the composite laminate. Alternatively, the layer 114 may be formed of commingled carbon fiber and boron fiber in each ply wherein the carbon fiber comprises a 1.87 gm/cc of carbon while the boron fiber comprises 2.82 gm/cc boron on a tungsten filament. Optionally, located outboard of layer 114, a thin polymer layer of metallic nano-strand material 114' or metallic Z transverse orientation stitch thread in a three-dimensional carbon weave may be included.

Located outboard of layer 114 is layer 116 of metallic foil, preferably one or more layers of tungsten foil, aluminum foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil for the layer 116 provides protection against various types of primary radiation, has a high melting point, high tensile strength, and high tensile strength with high temperature resistance to a hot pulse from a nuclear event. The layer 116 may be coated with an exterior polymeric coating 116' comprising a material having low solar absorptivity and high emissivity such as a clear multifunctional thermal control dielectric polymer, such an example as a polyimide, including single walled nano-tubes at ~0.1% volume loading which results in a coating having ~68% transmission, ~0.268 solar absorptivity, ~0.578 thermal emissivity, and an adequate electrical conductivity. Alternatively, a sol-gel resin matrix coating with an indium tin oxide thermal control overcoat may be used resulting in a coating having ~0.17 solar absorptivity, ~0.90 thermal emissivity, and adequate electric conductivity. The sol-gel could include single walled nano-tubes to avoid the use of indium tin oxide antireflection coating. Other coatings mixed with boron compounds, such as boron nitride, nano-tubes, tungsten and boron, or boron particles, can be used where boron fibers cannot be used for surface conforming. The exterior surface reflectance is effective for countering laser attacks. The use of foil on the exterior of the composite structure 100 acts as a surface barrier to the composite structure 100 for ground moisture and the environment in space, minimizing atomic oxygen erosion of the composite structure 100.

The use of layered foils, such as layers 104, 108, 112, and 116 distributed throughout the laminate thickness provide improved radiation resistant and space debris impact resistance. The use of layer foils in any craft using the composite structure 100 minimizes any displacement damage thereto (damage caused by an incident energetic photons or atomic particles imparting enough energy to an atom to displace it from its lattice site where the damage may be caused by neutron fluence from nuclear weapons and protons and electrons from the natural environment).

Figure 2:
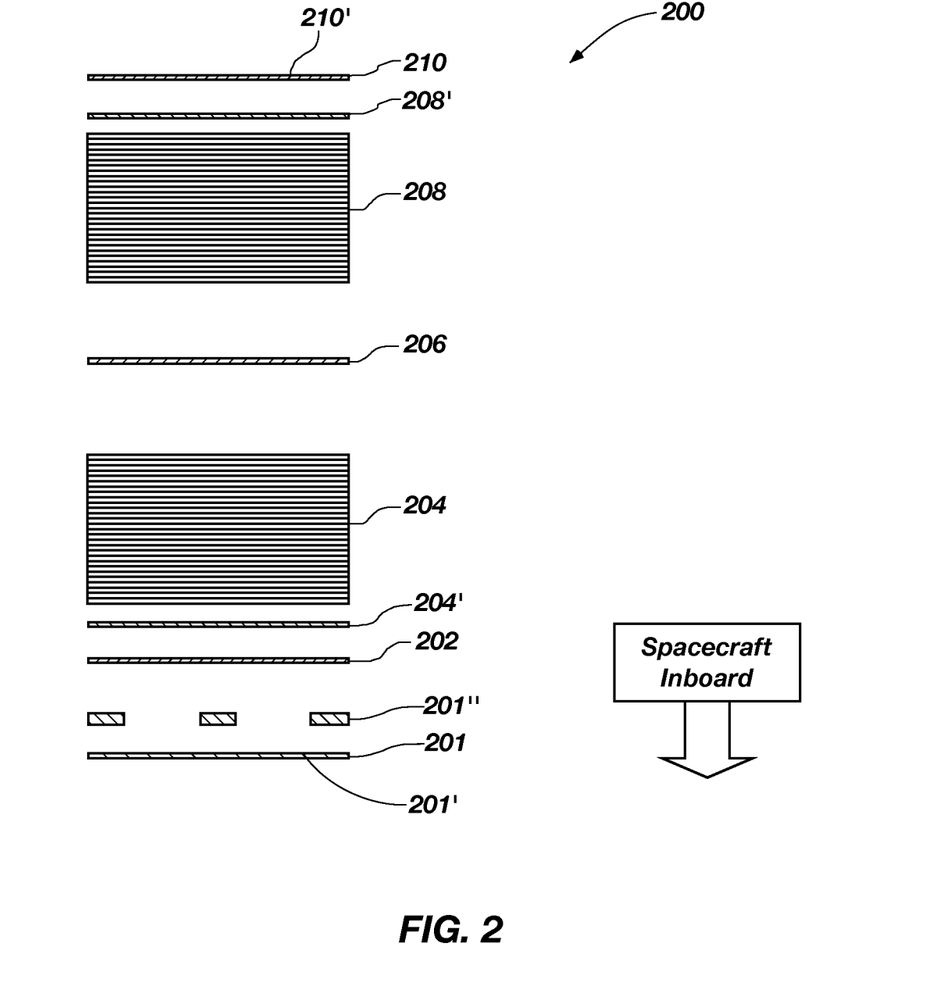
FIG. 2 is a cross-sectional view of a second embodiment of the composite structure of the invention as an enclosed cylindrical tube or rhomboid tube.

Referring to drawing FIG. 2, a second embodiment of a composite structure 200 of the invention for use in forming an enclosed cylindrical or rhomboid tube-shaped laminate, which is radiation resistant, has high strength to weight, and has high rigidity is illustrated in cross-section. The composite structure 200 comprises a laminate including various layers of materials. From the inboard of the enclosed part, a layer 201 of low modulus high density polyethylene film or fiber fabric may be used, with the layer 201 optionally being hydrogenated and filled with carbon nano-tubes, or having a metallized layer 201' disposed thereon. The thickness of the layer 201 of the high density polyethylene film or fiber fabric and the thickness of the metallized layer 201' thereon may be any desired thickness to be determined by the environment, the loading, and the particular application in which the composite is to be used and is attached by a thin epoxy layer 201".

Located outboard of the layer 201 is layer 202 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 202, as it provides protection against various types of primary radiation, has a high melting point, high tensile strength in response to thermal shock, and high tensile strength with high temperature resistance to a hot pulse from a nuclear event.

Located outward of the metallic foil layer 202 is a fiber layer 204, a plurality of balanced and symmetric oriented uni-tape or fabric plies 204 of a high modulus carbon fiber and boron fiber embedded in a polymer resin matrix, such as a thermosetting cyanate ester or epoxy resin. Typically, the carbon fiber comprises uni-tape and/or 8HS/PW weave form, having high compression strength and a slightly negative coefficient of thermal expansion. The boron fiber comprises uni-tape having a high modulus of elasticity, a low positive coefficient of thermal expansion, and neutron absorbing properties. The layer 204 preferably comprises a boron/carbon fiber laminate having a high stiffness to weight ratio and high strength to weight ratio. The layer 204 comprises various layers or plies, oriented and stacked in a prescribed pattern tailored to meet the structural requirements of the layer 204. The layer 204 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 204 may have a low coefficient of moisture expansion in one direction with high stiffness and low weight. The layer 204 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon and boron fibers, laminates can be produced which have a coefficient of thermal expansion equivalent to or lower than INVAR® 36 FeNi, or other foils. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 204 is preferably formed from uni-tape or fabric of carbon fiber and boron fiber in a cyanate ester or epoxy resin. The carbon fiber weighs approximately 1.87 gm/cc while the boron fiber comprises 2.82 gm/cc boron on a tungsten filament. The cyanate ester resin or epoxy resin may comprise any suitable cyanate ester or epoxy resin having the desired properties for use with the carbon fibers and boron fibers and the desired coefficient of thermal expansion and coefficient of moisture expansion for the composite laminate. Alternatively, the layer 204 may be formed of commingled carbon fiber and boron fiber in each ply wherein the carbon fiber weighs approximately 1.87 gm/cc while the boron fiber comprises 2.82 gm/cc boron on a tungsten filament. Optionally located inboard of layer 204, there may be attached a thin polymer layer of metallic nanostrand material 204' or a metallic Z transverse orientation stitch thread in a three-dimensional carbon weave.

Located outboard of layer 204 is layer 206, which comprises a metal foil layer, preferably one or more layers of tantalum foil, aluminum foil, titanium foil, tungsten foil, or beryllium foil. The layer 206 may have a film adhesive 206' layer thereon, such as a cyanate ester or epoxy resin, for attachment to the layer 206 and any other layers.

Located outboard of layer 206 is a fiber layer 208, a plurality of balanced and symmetric oriented uni-tape or fabric plies 208 of a high modulus carbon fiber and boron fiber embedded in a polymer resin matrix such as a thermosetting cyanate ester or epoxy resin. Typically, the carbon fiber comprises uni-tape and/or 8HS/PW weave form, having high compression strength and a slightly negative coefficient of thermal expansion. The boron fiber comprises uni-tape having a high modulus of elasticity, a low positive coefficient of thermal expansion, and neutron absorbing properties. The layer 208 preferably comprises a boron/carbon fiber laminate having a high stiffness to weight ratio and high strength to weight ratio. The layer 208 comprises various layers or plies, oriented and stacked in a prescribed pattern tailored to meet the structural requirements of the layer 208. The layer 208 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 208 may have a low coefficient of moisture expansion in one direction with high stiffness and low weight. The layer 208 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon and boron fibers laminates can be produced which have a coefficient of thermal expansion equivalent to or lower than INVAR® 36 FeNi, or other foils. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 208 is preferably formed from uni-tape or fabric of carbon fiber and boron fiber in a cyanate ester resin or epoxy resin. The carbon fiber weighs approximately 1.87 gm/cc while the boron fiber comprises 2.82 gm/cc boron on a tungsten filament. The cyanate ester resin or epoxy resin may comprise any suitable cyanate ester resin or epoxy resin having the desired properties for use with the carbon fibers and boron fibers and the desired coefficient of thermal expansion and coefficient of moisture expansion for the composite laminate. Alternatively, the layer 208 may be formed of commingled carbon fiber and boron fiber in each ply wherein the carbon fiber weighs approximately 1.87 gm/cc while the boron fiber comprises 2.82 gm/cc boron on a tungsten filament. Optionally located outboard on 208, there may be attached a thin polymer layer of metallic nano-strand material 208' or a metallic Z transverse orientation stitch thread in a three-dimensional carbon weave.

Located outboard of layer 208 is layer 210 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 210 as it provides protection against various types of primary radiation, has a high melting point, high tensile strength in response to thermal shock, and high tensile strength with high temperature resistance to a hot pulse from a nuclear event. The metallic foil layer 210 may be coated with an exterior polymeric resin matrix 210' comprising a material having low solar absorptivity and high emissivity such as a clear multifunctional thermal control dielectric polymer, such an example as polyimide, including single walled nano-tubes at ~0.1% volume loading which results in a resin matrix having 68% transmission, ~0.268 solar absorptivity, ~0.578 thermal emissivity, and an adequate electrical conductivity. Alternatively, a sol-gel resin matrix with an indium tin oxide (ITO) thermal control overcoat may be used resulting in a resin matrix having ~0.17 solar absorptivity, ~0.90 thermal emissivity, and adequate electric conductivity. The sol-gel could include single walled nano-tubes to avoid the indium tin oxide (ITO) antireflection polymer coating. Other overcoat options may include polymers with antimony tin oxide (ATO) or aluminum zinc oxide (AZO). Other overcoat resins with nano-boron nitride, carbon nano-tubes, nano-alumino-silicates, or boron particles may be used. The exterior surface reflectance is effective for countering laser attacks. The use of foil on the exterior of the composite structure 100 acts as a surface barrier to the composite structure 100 for ground moisture and the environment in space, limiting atomic oxygen erosion of the composite structure 100.

The use of layered foils, such as layers 202, 206, and 210 distributed throughout the laminate thickness provide improved radiation resistant and space debris impact resistance. The use of layer foils in any craft using the composite structure 200 minimizes any displacement damage thereto (damage caused by an incident energetic photons or atomic particles imparting enough energy to an atom to displace it from its lattice site, where the damage may be caused by neutron fluence from nuclear weapons, or protons and electrons from the natural environment).

Figure 3:
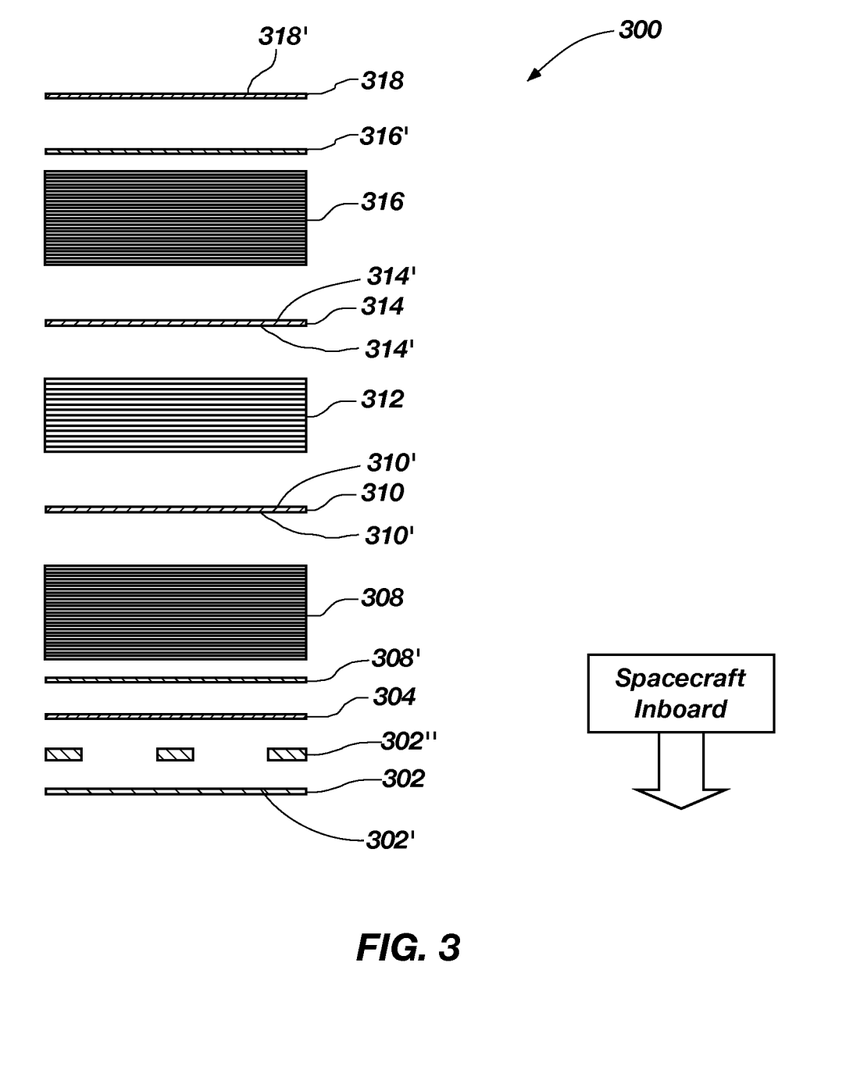
FIG. 3 is a cross-sectional view of a third embodiment of the composite structure of the invention as a thin layered laminate.

Referring to drawing FIG. 3, the third embodiment of the composite structure 300 of the invention for use in forming layered flat boron separated laminate panels which are radiation resistant, have high strength to weight, and have high rigidity is illustrated in cross-section. The composite structure 300 comprises a laminate including various layers of materials. From the inboard of the spacecraft, a layer 302 of low modulus high density polyethylene film or fiber fabric may be used, with the layer 302 optionally being hydrogenated and filled with carbon nano-tubes, or having a metallized layer 302' disposed thereon. The thickness of the layer 302 of the high density polyethylene film or fiber fabric and the thickness of the metallized layer thereon may be any desired thickness to be determined by the environment, the loading, and the particular application in which the composite is too used and is attached by a thin epoxy layer 302".

Located outward of the layer 302 is a layer 304 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 304 as it provides protection against various types of primary radiation, has a high melting point, high tensile strength in response to thermal shock, and high tensile strength with high temperature resistance to a hot pulse from a nuclear event.

Located outward of the metallic foil layer 304 is a fiber layer 308, a plurality of balanced and symmetric oriented uni-tape or fabric plies of a high modulus carbon fiber embedded in a polymer resin matrix such as a thermosetting cyanate ester resin or epoxy resin. Typically, the carbon fiber comprises uni-tape and/or 8HS/PW weave form, having high compression strength and a slightly negative coefficient of thermal expansion. The layer 308 preferably comprises a carbon fiber laminate having a high stiffness to weight ratio and high strength to weight ratio. The layer 308 comprises various layers or plies, oriented and stacked in a prescribed pattern tailored to meet the structural requirements of the layer 308. The layer 308 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 308 may have a low coefficient of moisture expansion in one direction with high stiffness and low weight. The layer 308 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon fiber, laminates can be produced which have a coefficient of thermal expansion equivalent to or lower than INVAR® 36 FeNi, or other foils. Through the particular selection of the type of fiber, the type of resin, and the angle of the fibers forming the plys of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 308 is preferably formed of plies of carbon fiber in a cyanate ester resin or epoxy resin for forming a composite having a weight of 0.0591 lb/inch$^3$. The carbon fiber weighs approximately 1.87 gm/cc. The cyanate ester resin or epoxy resin may comprise any suitable cyanate ester resin or epoxy resin having the desired properties for use with the carbon fibers and the desired coefficient of thermal expansion and coefficient of moisture expansion for the composite laminate. Optionally located inboard of layer 308, there may be attached a thin polymer layer of metallic nano-strand material 308' or a metallic Z transverse orientation stitch thread in a three-dimensional carbon weave.

Located outboard of layer 308 is layer 310 which comprises a metal foil layer, preferably one or more layers of tantalum foil, aluminum foil, titanium foil, tungsten foil, or beryllium foil. The layer 310 has a film adhesive 310' layer thereon, such as a cyanate ester resin or epoxy resin, for attachment to the layer 310 and any other layers.

Located outboard of the layer 310 is a laminate 312 of a plurality of boron fiber layers. The laminate 312 is comprised of a web of boron fiber having a fiber density of about 2.82 gm/cc, 0.0731 lb/inch$^3$, embedded in a cyanate ester resin or epoxy resin. The plies of boron fiber embedded in a cyanate ester resin or epoxy resin forming laminate 312 may be formed to have a near-zero coefficient of thermal expansion and near-zero coefficient of moisture expansion. The number of plies of boron fiber embedded in a cyanate ester or epoxy resin are varied depending upon the desired strength of the laminate 312, as well as the diameter of the either the fiber of the KEVLAR® fabric or the fiber of the carbon fiber being varied.

Typically, the boron fiber comprises uni-tape form, having high compression strength. The plies forming the honeycomb composite core preferably comprise a fiber laminate having a high stiffness to weight ratio and high strength to weight ratio. The plies comprise various layers or plies, oriented and stacked in a prescribed pattern tailored to meet the structural requirements of the laminate 312. The layers forming the laminate 312 may be formed to have a low coefficient of thermal expansion in one laminate direction. The layers forming the laminate 312 may have a low coefficient of moisture expansion in one direction with high stiffness and low weight. The layers forming the honeycomb composite core comprise a laminate where the coefficient of thermal expansion in one direction is determined by the type of fiber selected, the orientation of each layer of those fibers, and the fiber volume fraction ratio (the ratio of the volume of fibers to the total volume of the laminate). Boron fibers have a low coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a low coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the boron fibers at some angle relative to the reference direction of the fibers in order to produce a laminate with a near-zero coefficient of moisture expansion in the reference direction of the fibers. Through the use of boron fibers, laminates can be produced which have a coefficient of thermal expansion equivalent to or lower than INVAR® 36 FeNi, or other foils. Through the particular selection of the type of fiber, the type of resin, and the angle of the fibers forming the layers of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the plies forming the laminate 312 are preferably formed of plies of boron fiber in a cyanate ester resin or epoxy resin. The cyanate ester resin or epoxy resin may comprise any suitable cyanate ester resin or epoxy resin having the desired properties for use with the carbon fibers and boron fibers and the desired coefficient of thermal expansion and coefficient of moisture expansion for the composite laminate. Alternatively, the laminate 312 may be formed of commingled boron fibers and carbon fibers in each ply in a cyanate resin wherein the carbon fiber comprises 1.87 gm/cc and the boron fiber comprises 2.82 gm/cc boron on a tungsten filament.

Located outboard of the laminate 312 is layer 314 which comprises a metal foil layer, preferably one or more layers of tantalum foil, aluminum foil, titanium foil, tungsten foil, or beryllium foil. The layer 314 has a film adhesive 314' layer thereon, such as a cyanate ester resin or epoxy resin, for attachment to the laminate 312 and any other layers.

Located outboard of layer 314 is a fiber layer 316, a plurality of balanced and symmetric oriented uni-tape or fabric plies 316 of a high modulus carbon fiber embedded in a polymer resin matrix such as a thermosetting cyanate ester resin or epoxy resin. Typically, the carbon fiber comprises uni-tape and/or 8HS/PW weave form, having high compression strength and a slightly negative coefficient of thermal expansion. The layer 316 preferably comprises a carbon fiber laminate having a high stiffness to weight ratio and high strength to weight ratio. The layer 316 comprises various layers or plies, oriented and stacked in a prescribed pattern tailored to meet the structural requirements of the layer 316. The layer 316 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 316 may have a low coefficient of moisture expansion in one direction with high stiffness and low weight. The layer 316 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon fiber, laminates can be produced which have a coefficient of thermal expansion equivalent to or lower than INVAR® 36 FeNi, or other foils. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 316 is preferably formed of plies of carbon fiber in a cyanate ester resin or epoxy resin for forming a composite having a weight of 0.0591 lb/inch³. The carbon fiber weighs approximately 1.87 gm/cc. The cyanate ester resin or epoxy resin may comprise any suitable cyanate ester resin or epoxy resin having the desired properties for use with the carbon fibers and the desired coefficient of thermal expansion and coefficient of moisture expansion for the composite laminate. Optionally located inboard of 316, there may be attached a thin polymer layer of metallic nano-strand material 316' or a metallic Z transverse orientation stitch thread in a three-dimensional carbon weave.

Located outboard of layers 316 is layer 318 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 318, as it provides protection against various types of primary radiation, has a high melting point, high tensile strength in response to thermal shock, and high tensile strength with high temperature resistance to a hot pulse from a nuclear event. The layer 318 may be coated with an exterior polymeric resin matrix 318' comprising a material having low solar absorptivity and high emissivity such as a clear multifunctional thermal control dielectric polymer, such an example as polyimide, including single walled nano-tubes at ~0.1% volume loading which results in a resin matrix having ~68% transmission, ~0.268 solar absorptivity, ~0.578 thermal emissivity, and an adequate electrical conductivity. Alternatively, a sol-gel resin matrix with an indium tin oxide (ITO) thermal control overcoat may be used resulting in a resin matrix having ~0.17 solar absorptivity, ~0.90 thermal emissivity, and adequate electric conductivity. The sol-gel could include single walled nano-tubes to avoid the indium tin oxide (ITO) antireflection resin matrix. Other overcoat resins with nano-boron nitride, carbon nano-tubes, nano-aluminosilicates, or boron particles may be used. The exterior surface reflectance is effective for countering laser attacks. The use of foil on the exterior of the composite structure 300 acts as a surface barrier to the composite structure 300 for ground moisture and the environment in space, limiting atomic oxygen erosion of the composite structure 300.

The use of layered foils, such as layers 304, 306, 310, 314, and 318 distributed throughout the laminate thickness provide improved radiation resistant and space debris impact resistance. The use of layer foils in any craft using the composite structure 300 minimizes any displacement damage thereto (damage caused by an incident energetic photons or atomic particles imparting enough energy to an atom to displace it from its lattice site, where the damage may be caused by neutron fluence from nuclear weapons, or protons and electrons from the natural environment).

Figure 4:
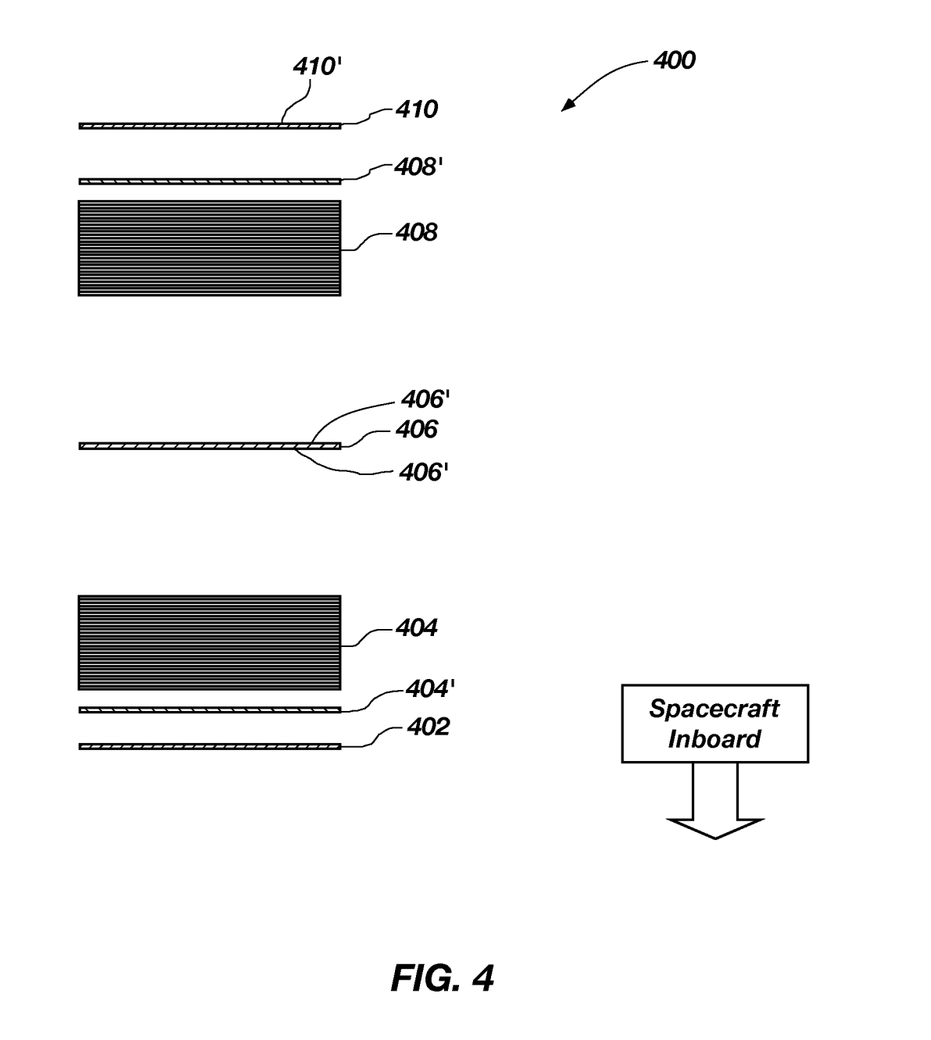
FIG. 4 is a cross-sectional view of a fourth embodiment of the composite structure of the invention as a conformal surface.

Referring to drawing FIG. 4, the fourth embodiment of the composite structure 400 of the invention for use for conforming layered laminates which are radiation resistant, have high strength to weight, and have high rigidity is illustrated in cross-section. The composite structure 400 comprises a laminate including various layers of materials. A layer 402 of metallic foil, preferably one or more layers of a layer of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 402, as it provides protection against various types of primary radiation, has a high melting point, high tensile strength in response to thermal shock, and high tensile strength with high temperature resistance to a hot pulse from a nuclear event.

Located outward of the metallic foil layer 402 is a fiber layer 404, a plurality of balanced and symmetric oriented uni-tape or fabric plies of a high modulus carbon fiber embedded in a polymer resin matrix, such as a thermosetting cyanate ester resin or epoxy resin having a density of about 0.0591 lb/inch³. Typically, the carbon fiber comprises uni-tape and/or 8HS/PW weave form, having high compression strength and a slightly negative coefficient of thermal expansion. The cyanate resin may include boron nitride particles therein at a desired amount. The layer 404 preferably comprises a carbon fiber laminate having a high stiffness to weight ratio and high strength to weight ratio. The layer 404 comprises various layers or plies, oriented and stacked in a prescribed pattern tailored to meet the structural requirements of the layer 404. The layer 404 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 404 may have a low coefficient of moisture expansion in one direction with high stiffness and low weight. The layer 404 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers in the reference direction increases, the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon fibers, laminates can be produced which have a coefficient of thermal expansion equivalent to or lower than INVAR® 36 FeNi, or other foils. Through the particular selection of the type of fiber, the type of resin, and the angle of the fibers forming the plys of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 404 is preferably formed of plies of carbon fiber in a cyanate ester or epoxy resin. The carbon fiber may comprise a carbon fiber or a 1.87 gm/cc of carbon. The cyanate ester or epoxy resin may comprise any suitable cyanate ester resin or epoxy resin having the desired properties for use with the carbon fibers and boron fibers and the desired coefficient of thermal expansion and coefficient of moisture expansion for the composite laminate. The resin may include nano-boron nitride or aluminosilicate particles, preferably as nanoparticle size, therein at a desired percentage of loading of the resin, likely at a loading of 0.10-25.0% by volume. Optionally located inboard of layer 404, there may be attached a thin polymer layer of metallic nano-strand material 404' or a metallic Z transverse orientation stitch thread in a three-dimensional carbon weave.

Located outboard of layer 404 is layer 406, which comprises a metal foil layer, preferably one or more layers of free-tantalum foil, aluminum foil, titanium foil, tungsten foil, or beryllium foil. The layer 406 may comprise a composite of one or more layers of different types of metal foil, such as a layer of tantalum foil, or a layer of aluminum foil, a layer of free-cut INVAR® 36 foil or a layer of tantalum foil, a layer of free-cut INVAR® 36 foil, and a layer of tungsten foil. The layer 406 may have a film adhesive 406' layer thereon, such as a cyanate ester or epoxy resin, for attachment to the layer 406 and any other layers.

Located outward of the layer 406 is a fiber layer 408, a plurality of balanced and symmetric oriented uni-tape or fabric plies of a high modulus carbon fiber embedded in a polymer resin matrix such as a thermosetting cyanate ester or epoxy resin having a density of about 0.0591 lb/inch$^3$. Typically, the carbon fiber comprises uni-tape and/or 8HS/PW weave form, having high compression strength and a slightly negative coefficient of thermal expansion. The cyanate resin may include boron nitride particles therein at a desired amount. The layer 408 preferably comprises a carbon fiber laminate having a high stiffness to weight ratio and high strength to weight ratio. The layer 408 comprises various layers or plies, oriented and stacked in a prescribed pattern tailored to meet the structural requirements of the layer 408. The layer 408 may be formed to have a near-zero coefficient of thermal expansion in one laminate direction to that it is equal to or better than that of INVAR® 36 FeNi, a steel alloy having the lowest coefficient of thermal expansion of a traditional metal material. The layer 408 may have a low coefficient of moisture expansion in one direction with high stiffness and low weight. The layer 408 comprises a laminate where the coefficient of thermal expansion in one direction is determined by the type of fiber selected, the orientation of each layer of those fibers, and the fiber volume fraction ratio (the ratio of the volume of fibers to the total volume of the laminate). Carbon fibers have a negative coefficient of thermal expansion in the direction of the fiber. Resins bonding the fiber together have a positive coefficient of thermal expansion. For a particular combination of fiber, resin, and fiber volume fraction, some or all of the fibers will need to be oriented at an angle relative to the reference direction in order to produce a laminate with a near-zero coefficient of thermal expansion in the reference direction of the fiber. Carbon fiber's negative CTE can be balanced against the positive CTE of the selected foils described herein. As the angle of the fibers increase in the reference direction increases the modulus of elasticity of the laminate decreases.

The coefficient of moisture expansion of the laminate is determined by the type of fiber selected, the orientation of each layer of fibers, the fiber volume fraction, and the coefficient of moisture expansion of the resin. Typical resins used for composite laminates absorb atmospheric moisture. Typically, carbon fibers do not absorb atmospheric moisture. When the resin absorbs and desorbs moisture, the composite laminate expands and contracts in length with the amount of expansion and contraction per unit length and per unit change in moisture content defined as the coefficient of moisture expansion. For a particular type fiber, resin, and fiber volume fraction, it is necessary to orient some or all of the carbon fibers at some angle relative to the reference direction of the fibers in order to produce a laminate with a near-zero coefficient of moisture expansion in the reference direction of the fibers. Through the use of carbon fibers, laminates can be produced which have a coefficient of thermal expansion equivalent to or lower than INVAR® 36 FeNi, or other foils. Through the particular selection of the type of fiber, the type of resin, and the angle of the fibers forming the plies of the laminate with respect to the reference direction of the fibers, a composite laminate can be formed having a near-zero coefficient of thermal expansion and a near-zero coefficient of moisture expansion while forming a composite laminate having a high stiffness, low weight, and high modulus of elasticity.

In this embodiment of the invention, the layer 408 is preferably formed of plies of carbon fiber in a cyanate ester or epoxy resin. The carbon fiber may comprise a carbon fiber or a 1.87 gm/cc of carbon. The cyanate ester resin or epoxy resin may comprise any suitable cyanate ester resin or epoxy resin having the desired properties for use with the carbon fibers and boron fibers and the desired coefficient of thermal expansion and coefficient of moisture expansion for the composite laminate. The resin may include nano-boron nitride or alumino-silicate particles, preferably as nanoparticle size, therein at a desired percentage of loading of the resin, likely at a loading of 0.10-25.0% by volume. Optionally located inboard of layer 408, there may be attached a thin polymer layer of metallic nano-strand material 408' or a metallic Z transverse orientation stitch thread in a three-dimensional carbon weave.

Located outboard of layer 408 is layer 410 of metallic foil, preferably one or more layers of tantalum foil, aluminum foil, titanium foil, tungsten foil, beryllium foil, or free-cut INVAR® 36 foil, known generically as free-cut INVAR® 36 alloy having a typical analysis of carbon 0.05%, silicon 0.35%, cobalt 0.20%, manganese 0.90%, nickel 36%, selenium 0.20%, and the balance iron. Generally, the metallic foil layer 410, as it provides protection against various types of primary radiation, has a high melting point, high tensile strength in response to thermal shock, and high tensile strength with high temperature resistance to a hot pulse from a nuclear event. The metallic foil layer 410 may comprise a composite of one or more layers of different types of metal foil, such as a layer of tantalum foil, or a layer of aluminum foil, a layer of free-cut INVAR® 36 foil or a layer of tantalum foil, a layer of free-cut INVAR® 36 foil, and a layer of tungsten foil. The metallic foil layer 410 may be coated with an exterior polymeric resin matrix 410' comprising a material having low solar absorptivity and high emissivity such as a clear multifunctional thermal control dielectric polymer, such an example as polyimide, including single walled nano-tubes at ~0.1% volume loading which results in a resin matrix having ~68% transmission, ~0.268 solar absorptivity, ~0.578 thermal emissivity, and an adequate electrical conductivity. Alternatively, a sol-gel resin matrix with an indium tin oxide (ITO) thermal control overcoat may be used resulting in a resin matrix having ~0.17 solar absorptivity, ~0.90 thermal emissivity, and adequate electric conductivity. The sol-gel could include single walled nano-tubes to avoid the indium tin oxide (ITO) antireflection polymer coating. Other overcoat options may include polymers with antimony tin oxide (ATO) or aluminum zinc oxide (AZO). Other overcoat resins with nano-boron nitride, carbon nano-tubes, nano-aluminosilicates, or boron particles may be used. The exterior surface reflectance is effective for countering laser attacks. The use of foil on the exterior of the composite structure 400 acts as a surface barrier to the composite structure 400 for ground moisture and the environment in space, limiting atomic oxygen erosion of the composite structure 400.

The use of layered foils, such as layers 402, 406, and 410 distributed throughout the laminate thickness provide improved radiation resistant and space debris impact resistance. The use of layer foils in any craft using the composite structure 400 minimizes any displacement damage thereto (damage caused by an incident energetic photons or atomic particles imparting enough energy to an atom to displace it from its lattice site, where the damage may be caused by neutron fluence from nuclear weapons, or protons and electrons from the natural environment).

It will be apparent to those of skill in the art that changes, revisions, additions, and deletions may be made to the present invention, such as having composites of differing shapes, thickness, combinations of materials, etc. Such are intended to be within the scope of the claimed invention.

What is claimed is:

1. A cored, balanced and symmetric composite structure, the composite structure from inboard to outboard comprising:
   a first layer of high modulus metal;
   a first fiber layer including a plurality of high modulus balanced and symmetric plies, each ply comprising at least one of carbon fiber and boron fiber, in a cyanate ester resin matrix, attached to the first fiber layer, the first fiber layer comprising both carbon fiber plies and boron fiber plies;
   a second layer of high modulus metal attached to the first fiber layer;
   a layer comprising a honeycomb composite core including one of aromatic polyamide fiber or carbon fiber as a woven fabric and attached to the second layer of high modulus metal;
   a third layer of high modulus metal attached to a second fiber layer and the layer comprising a honeycomb composite core;
   a second fiber layer, including a plurality of high modulus balanced and symmetric plies, each ply comprising at least one of carbon fiber and boron fiber, in a cyanate ester resin matrix; and
   a fourth layer of high modulus metal attached to the second fiber layer;
   wherein each of the first, second, third and fourth layers of high modulus metal comprises one of tantalum, tungsten, beryllium, and a free-cut FeNi alloy having a typical analysis of carbon 0.05%, silicon 0.35%, cobalt 0.20%, manganese 0.90%, nickel 36%, selenium 0.20%, and the balance iron.

2. The composite structure of claim 1, further comprising a nanoparticle filled thermal control coating on an outer surface of the fourth layer of high modulus metal.

3. The composite structure of claim 1, further comprising: a layer of low modulus high density polyethylene film or fiber fabric attached inboard of the first layer of high modulus metal.

4. The composite structure of claim 3, wherein the layer of low modulus high density polyethylene film or fiber fabric comprises a layer of high density hydrogenated polyethylene filled with carbon nanoparticles attached to an inner surface of the first layer of high modulus metal.

5. The composite structure of claim 1, wherein the first fiber layer includes a plurality of plies comprised of uni-tape or of fabric plies, each ply comprised of carbon fibers, or boron fibers comprising boron on a tungsten filament.

6. The composite structure of claim 5, wherein one or more of the uni-tape plies comprise commingled boron and carbon fiber in each ply of a cyanate ester resin matrix.

7. The composite structure of claim 1, wherein the layer comprising a honeycomb composite core includes one of a uni-tape or a plurality of fabric plies of woven fabric in the form of a honeycomb composite core comprising aromatic polyamide fiber or carbon fiber.

8. The composite structure of claim 1, wherein the second fiber layer includes a plurality of plies comprised of uni-tape or of fabric plies, each ply comprised of carbon fibers, or boron fibers comprising boron on a tungsten filament.

9. The composite structure of claim 8, wherein one or more of the uni-tape plies include commingled boron and carbon fiber in each ply of a cyanate ester resin matrix.

10. The composite structure of claim 1, further comprising one of a polymer layer of metallic nano-strand material or a metallic Z transverse orientation stitch thread material in a three-dimensional carbon weave between the first high modulus metal layer and the first fiber layer.

11. The composite structure of claim 1, further comprising one of a polymer layer of metallic nano-strand material or a metallic Z transverse orientation stitch thread material in a three-dimensional carbon weave between the fourth layer of high modulus metal and the second fiber layer.

12. A symmetric composite structure capable of conforming to a cylindrical body, the composite structure from inboard to outboard comprising:
a first layer of high modulus metal;
a first fiber layer including a plurality of high modulus balanced and symmetric plies, each ply comprising at least one of carbon fiber and boron fiber, in a cyanate ester resin matrix, the first fiber layer comprising both carbon fiber and boron fiber and attached to the first layer of high modulus metal;
a second layer of high modulus metal attached to the first fiber layer and a second layer fiber layer;
a second fiber layer including a plurality of high modulus balanced and symmetric plies, each ply comprising at least one of carbon fiber and boron fiber, in a cyanate ester resin matrix, the second fiber layer comprising both carbon fiber and boron fiber; and
a third layer of high modulus metal attached to the second fiber layer;
wherein each of the first, second and third layers of high modulus metal comprises one of tantalum, tungsten, beryllium, and a free-cut FeNi alloy having a typical analysis of carbon 0.05%, silicon 0.35%, cobalt 0.20%, manganese 0.90%, nickel 36%, selenium 0.20%, and the balance iron.

13. The composite structure of claim 12, further comprising a nanoparticle filled thermal control polymer coating on an exterior surface of the third layer of high modulus metal.

14. The composite structure of claim 12, further comprising a layer of one of a low modulus high density polyethylene film or fiber fabric attached inboard of the first layer of high modulus metal.

15. The composite structure of claim 14, wherein the layer of one of a low modulus high density polyethylene film or fiber fabric comprises high density hydrogenated polyethylene filled with carbon nanoparticles.

16. The composite structure of claim 12, wherein the first fiber layer includes a plurality of plies comprised of uni-tape or fabric plies, each ply comprised of carbon fibers, or boron fibers comprising boron on a tungsten filament.

17. The composite structure of claim 16, wherein the first fiber layer including a plurality of plies comprises one or more of the uni-tape or fabric plies comprised of one or more of commingled boron and carbon fiber in each ply of a cyanate ester resin matrix.

18. The composite structure of claim 12, wherein the second fiber layer includes a plurality of plies comprised of uni-tape or fabric, each ply comprised of carbon fibers, or boron fibers comprising boron on a tungsten filament.

19. The composite structure of claim 18, wherein one or more of the uni-tape plies comprises commingled boron and carbon fiber in each ply of a cyanate ester resin matrix.

20. The composite structure of claim 12, further comprising one of a layer of metallic nano-strand material or a metallic Z transverse orientation stitch thread material in a three-dimensional carbon weave located between the first layer of high modulus metal and the first fiber layer.

21. The composite structure of claim 12, further comprising one of a layer of metallic nano-strand material or a metallic Z transverse orientation stitch thread material in a three-dimensional carbon weave located between the second fiber layer and the third layer of high modulus metal.

22. A balanced and symmetric composite structure capable of conforming to a rhomboid body, the composite structure from inboard to outboard comprising:
a first layer of high modulus metal;
a first fiber layer including a plurality of high modulus balanced and symmetric plies, each ply comprising at least one of carbon fiber and boron fiber, in a cyanate ester resin matrix, the first fiber layer comprising both carbon fiber and boron fiber and attached to the first layer of high modulus metal;
a second layer of high modulus metal attached to the first fiber layer and a second fiber layer;
the second fiber layer including a plurality of high modulus balanced and symmetric plies, each ply comprising at least one of carbon fiber or boron fiber, in a cyanate ester resin matrix, the second fiber layer comprising both carbon fiber and boron fiber; and
a third layer of high modulus metal attached to the second fiber layer;
wherein each of the first, second and third layers of high modulus metal comprises one of tantalum, tungsten, beryllium, and a free-cut FeNi alloy having a typical analysis of carbon 0.05%, silicon 0.35%, cobalt 0.20%, manganese 0.90%, nickel 36%, selenium 0.20%, and the balance iron.

23. The composite structure of claim 22, further comprising a nanoparticle filled thermal control polymer coating on an exterior surface of the third layer of high modulus metal.

24. The composite structure of claim 22, further comprising a layer of one of a low modulus high density polyethylene film or fiber fabric attached inboard of the first layer of high modulus metal.

25. The composite structure of claim 24, wherein the layer of one of a low modulus high density polyethylene film or fiber fabric comprises high density hydrogenated polyethylene filled with carbon nanoparticles.

26. The composite structure of claim 22, wherein the first fiber layer including a plurality of plies comprised of uni-tape or fabric plies, each plys comprised of carbon fibers, or boron fibers comprising boron on a tungsten filament.

27. The composite structure of claim 26, wherein the first fiber layer including a plurality of plies comprises one or more of the uni-tape or fabric plies comprised of one or more of commingled boron and carbon fiber in each ply of a cyanate ester resin matrix.

28. The composite structure of claim 22, wherein the second fiber layer includes a plurality of plies comprised of uni-tape or fabric plies, each ply comprised of carbon fibers, or boron fibers comprising boron on a tungsten filament.

29. The composite structure of claim 28, wherein one or more of the uni-tape or fabric plies comprises one or more of commingled boron and carbon fiber in each ply of a cyanate ester resin matrix.

30. The composite structure of claim 22, further comprising one of a layer of metallic nano-strand material or a metallic Z transverse orientation stitch thread material in a three-dimensional carbon weave located adjacent the first layer of high modulus metal and the first fiber layer.

31. The composite structure of claim 22, further comprising one of a layer of metallic nano-strand material or a metallic Z transverse orientation stitch thread material in a three-dimensional carbon weave located adjacent the second fiber layer and the third layer of high modulus metal.

32. A thin layered, flat, balanced and symmetric composite structure, the composite structure from inboard to outboard comprising:
a first layer of high modulus metal;
a first fiber layer including a plurality of high modulus balanced and symmetric plies, each ply comprising carbon fiber in a cyanate ester resin or epoxy resin matrix, the first fiber layer attached to the first layer of high modulus metal and a second layer of high modulus metal;

a second layer of high modulus metal attached to the first fiber layer and a second fiber layer;

a second fiber layer including a plurality of high modulus balanced and symmetric plies, each ply comprising boron fiber or commingled boron fiber and carbon fiber, each ply in cyanate ester resin or epoxy resin matrix attached to a third layer of high modulus metal;

a third layer of high modulus metal attached to the second fiber layer and a third fiber layer;

a third fiber layer including a plurality of plies of high modulus balanced and symmetric plies, each ply comprising carbon fiber in a cyanate ester resin or epoxy resin matrix, attached to a fourth layer of high modulus metal; and a fourth layer of high modulus metal;

wherein each of the first, second, third and fourth layers of high modulus metal comprises one of tantalum, tungsten, beryllium, and a free-cut FeNi alloy having a typical analysis of carbon 0.05%, silicon 0.35%, cobalt 0.20%, manganese 0.90%, nickel 36%, selenium 0.20%, and the balance iron.

33. The composite structure of claim 32, further comprising a nanoparticle filled thermal control coating on an exterior surface of the fourth layer of high modulus metal.

34. The composite structure of claim 32, further comprising a layer of one of a low modulus high density polyethylene film or a fiber fabric attached inboard of the first layer of high modulus metal.

35. The composite structure of claim 34, wherein the layer comprising one of a low modulus high density polyethylene film or a fiber fabric comprises high density hydrogenated polyethylene filled with carbon nanoparticles.

36. The composite structure of claim 32, wherein the first fiber layer comprises a uni-tape or fabric comprised of a plurality of carbon fiber plies.

37. The composite structure of claim 32, wherein the boron fiber of the second fiber layer of uni-tape plies comprises a boron fiber having a tungsten filament.

38. The composite structure of claim 37, wherein one or more of the uni-tape layers comprises commingled boron and carbon fiber in each ply of a cyanate ester resin matrix.

39. The composite structure of claim 32, wherein the third fiber layer comprise a of uni-tape or fabric comprised of a plurality of carbon fiber plies.

40. The composite structure of claim 32, further comprising one of a layer of metallic nano-strand material or a metallic Z transverse orientation stitch thread material in a three-dimensional carbon weave located between the first layer of high modulus metal and the first fiber layer.

41. The composite structure of claim 32, further comprising one of a layer of metallic nano-strand material or a metallic Z transverse orientation stitch thread material in a three-dimensional carbon weave located between the third fiber layer and the fourth layer of high modulus metal.

42. A conformal, balanced and symmetric composite structure, the composite structure from inboard to outboard comprising:

a first layer of high modulus metal;

a first fiber layer including a plurality of balanced and symmetric plies, each ply comprising carbon fiber in a cyanate ester resin having nanoparticles therein of a material other than carbon, the first fiber layer attached to the first layer of high modulus metal;

a second layer of high modulus metal attached to the first fiber layer and a second fiber layer;

the second fiber layer including a plurality of high modulus balanced and symmetric plies, each ply comprising carbon fiber in a cyanate ester resin having nanoparticles therein of a material other than carbon; and a third layer of high modulus metal attached to the second fiber layer;

wherein each of the first, second and third layers of high modulus metal comprises one of tantalum, tungsten, beryllium, and a free-cut FeNi alloy having typical analysis of carbon 0.05%, silicon 0.35%, cobalt 0.20%, manganese 0.90%, nickel 36%, selenium 0.20%, and the balance iron.

43. The composite structure of claim 42, further comprising a nanoparticle filled thermal control polymer coating on an exterior surface of the third layer of high modulus metal.

44. The composite structure of claim 42, wherein the first fiber layer comprises a uni-tape or fabric comprised of a plurality of carbon fiber plies.

45. The composite structure of claim 44, wherein the nanoparticles comprise Boron-Nitride particles or Boron-Nitride nanoparticles and/or Alumino-Silicate particles or Alumino-Silicate nanoparticles in a cyanate ester resin or epoxy resin matrix, in a loading of 0.10-25.0% by volume.

46. The composite structure of claim 42, wherein the second fiber layer comprises a uni-tape or fabric comprised of a plurality of carbon fiber plies.

47. The composite structure of claim 46, wherein the nanoparticles comprise Boron-Nitride particles or Boron-Nitride nanoparticles and/or Alumino-Silicate particles or Alumino-Silicate nanoparticles in a cyanate ester resin or epoxy resin matrix, in a loading of 0.10-25.0% by volume.

48. The composite structure of claim 42, further comprising one of a layer of metallic nano-strand material or a metallic Z transverse orientation stitch thread material in a three-dimensional carbon weave located between the first layer of high modulus metal and the first fiber layer.

49. The composite structure of claim 42, further comprising one of a layer of metallic nano-strand material or a metallic Z transverse orientation stitch thread material in a three-dimensional carbon weave located between the second fiber layer and the third layer of high modulus metal.

* * * * *

UNITED STATES PATENT AND TRADEMARK OFFICE
CERTIFICATE OF CORRECTION

PATENT NO. : 8,460,777 B2  
APPLICATION NO. : 12/247090  
DATED : June 11, 2013  
INVENTOR(S) : David S. Long It is certified that error appears in the above-identified patent and that said Letters Patent is hereby corrected as shown below:

In the specification:

| | | |
|---|---|---|
| COLUMN 5, | LINE 29, | change "embodiment of the" to --embodiment of a-- |
| COLUMN 5, | LINE 62, | change "plies 106 of" to --plies of-- |
| COLUMN 9, | LINE 17, | change "the plys" to --the plies-- |
| COLUMN 10, | LINE 45, | change "plies 204 of" to --plies of-- |
| COLUMN 11, | LINE 64, | change "plies 208 of" to --plies of-- |
| COLUMN 14, | LINE 10, | change "layer 304 as" to --layer 304, as-- |
| COLUMN 15, | LINE 1, | change "the plys" to --the plies-- |
| COLUMN 16, | LINE 45, | change "plies 316 of" to --plies of-- |
| COLUMN 17, | LINE 60, | change "The layer 318" to --The metallic foil layer 318-- |

In the claims:

CLAIM 26, COLUMN 24, LINE 36, change "each plys" to --each ply--  
CLAIM 39, COLUMN 25, LINE 46, change "comprise a of uni-tape" to --comprises a uni-tape--

Signed and Sealed this  
Fifteenth Day of September, 2015

Michelle K. Lee  
*Director of the United States Patent and Trademark Office*